Patented July 11, 1939

2,166,074

UNITED STATES PATENT OFFICE

2,166,074

GELATINOUS COLLOIDS

John Reichel, Philadelphia, Pa., assignor to Sharp & Dohme, Incorporated, Philadelphia, Pa., a corporation of Maryland (1929)

No Drawing. Application April 9, 1937, Serial No. 135,938

10 Claims. (Cl. 252—6)

This invention relates to gelatinous colloids in a new, solid, porous form, and includes both the new substances and methods of producing them. More particularly, the invention relates to such gelatinous colloids as gelatin, gum tragacanth, gum arabic, pectin, etc., in the form of dry, porous, friable masses of extremely low density which disperse or dissolve more readily in water than do the same products when prepared in the solid forms heretofore known, the dispersion or solution being readily effected at lower temperatures than has heretofore been possible, and without the tendency to form lumps which has heretofore been characteristic of these products.

Such materials as gelatin, gum tragacanth, pectin, gum acacia, etc., have heretofore been available and have been widely used in a solid form, usually in granulated or powdered form; but these materials in such forms dissolve rather slowly in water, and require the use of relatively hot water to avoid the undue formation of lumps or agglomerates, and have generally been dissolved or dispersed in water by the use of heat and more or less vigorous agitation. The products of the present invention, in contrast with the relatively dense granules or powders which have previously been known, are in the form of highly porous, friable masses having a sponge-like structure, reticular in nature, with an immense network of capillary pores of microscopic size. The density of the new products is extremely small, the products being readily producible in unpulverized state with a density as low as 0.001 or even lower.

These new products dissolve or disperse very rapidly in water at lower temperatures than have heretofore been usable, and the materials, when water is added to them, do not form lumps, even when quite cold water is used. It is my theory that this ready solubility or dispersibility of the products at low temperature is due to porous, sponge-like character of their structure which permits the ready penetration of the water throughout the entire mass so that all of the material is wet in a very short time. The solutions so formed are fully equivalent to, and substantially the same as, solutions obtained from the ordinary commercial granular or powdered products. When the porous, friable products of the invention are subjected to compression, a product similar to ordinary granulated products is obtained; and the product so compressed does not have the advantages of the new products of the invention.

While the invention is applicable to practically all of the gelatinous colloids, such as pectin, gum tragacanth, gum arabic, gelatin, etc., it will be described in detail in connection with gelatin, as the new gelatin products are of particular importance.

According to the present invention, the gelatin is obtained in the new, porous, friable form by subjecting an aqueous solution or dispersion of the gelatin to freezing, advantageously by indirect contact with a suitable freezing agent or refrigerant, and by subliming the ice from the frozen material, while preventing softening or melting thereof, by the application thereto of a high vacuum.

Advantageously, the freezing of the gelatin solution is carried out by placing the liquid solution in a container, such as a flask or metal cylinder, and then freezing the material solidly and completely on the inside of the container by immersing the container in a freezing mixture at a temperature well below the freezing point of the material, or by spraying the charged container with the cooling substance, using suitable low temperature refrigerants. It may be desirable to add the gelatin solution to the container by installments, thus freezing it in layers on the interior of the container. The size of the containers, and the amount of gelatin processed in such containers, may be varied over a wide range from containers holding but a few cubic centimeters or less up to containers holding 100 litres or more of material, depending upon the use to which the gelatin product finally obtained is to be applied.

However, care should be taken when charging the container that too much of the liquid solution is not introduced into it, as it is important to maintain an adequate surface area to permit the sublimation of the ice at a sufficiently rapid rate, as will be described hereafter. Advantageously, the containers are about half filled with frozen material, and the frozen material should be more or less distributed around the inside of the container, forming an interior shell so as to provide a maximum surface, or, if relatively long, cylindrical containers are used, the material should be frozen while the container is in a horizontal position, advantageously while working the container, to provide an increased evaporating surface.

When the container has been charged to the desired extent with completely and solidly frozen material, a high vacuum is produced within the container, as by connecting the container with a vacuum tight connection to a condenser embedded in a freezing mixture at a sufficiently low temperature which is also connected with a high vacuum pump, the high vacuum so provided serving to effect sublimation or removal of the ice from the material in the container at a temperature below that at which the material melts or becomes liquid. The vacuum employed is as nearly a perfect vacuum as is readily obtainable with a high vacuum or super vacuum pump. When the vacuum becomes sufficiently high, water vapor leaves the frozen material, without melting it, and is collected in the form of ice in the condenser, a sufficient temperature differential being maintained between the frozen material and the ice in the condenser to insure the sublimation of the ice or water from the frozen material and its condensation in the condenser, the high vacuum pump serving to remove fixed gases and to maintain the high vacuum within the system.

The rate of evaporation or sublimation of the ice from the frozen material is sufficient to cool it to an extent such that it is maintained in a solid frozen state, until at least the greater part of the water is removed and insufficient water remains to convert the material to a liquid or gelatinous state if it attains a temperature above freezing. The ratio of exposed surface area to volume of material should be sufficient to permit this rapid removal of water with consequent auto-refrigeration of the frozen material; and, in general, the containers used should not be more than about one-half full. To increase the rate of evaporation of the water in the frozen material, the charged container may be warmed with warm circulating air or with a warm liquid, but the heat applied should not be sufficient to melt or even soften the frozen charge. In the later stages of the operation, after the removal of water is almost complete, it is advantageous to allow the temperature of the material to rise above the freezing point and to continue the application of the vacuum until the temperature of the gelatin approaches room temperature, or even higher temperatures, so as to hasten the removal of the last traces of water; but the attainment of these higher temperatures should not be permitted until the removal of water has progressed to an extent such that the material does not contain sufficient water to cause it to melt or liquefy.

As a result of this treatment of the gelatin solution a dry, solid gelatin is finally obtained having a porous sponge-like structure interspersed with a relatively immense network of minute capillary pores or passages from which the frozen water has been removed by sublimation.

The density of the final product obtained of course depends upon the amount of gelatin in the solution initially frozen, as the final product has substantially the shape and volume of the frozen material from which it is produced. In general, the gelatin solutions treated should be thinly fluid solutions containing, for example, from 0.1% or less to 2% or more of gelatin, the more dilute solutions giving less dense products, and the more concentrated solutions giving more dense products. Gelatin solutions containing as little as 0.1% or even less gelatin may be readily processed to produce a solid product having substantially the volume of the original frozen material; and such a product, while light and friable, nevertheless, unless too vigorously shaken, retains its shape and volume indefinitely.

As the concentration of gelatin in the solution treated is increased, the density of the product finally obtained increases, but so long as the proportion of gelatin in the original solution is not too high, a very light, porous, friable product having the property of rapidly dissolving in relatively cold water is obtained.

The invention is not only useful for the production of the pure gelatinous colloids in the new form, but is also useful for the production of preparations containing crystalline or colloidal substances, which ordinarily tend to deteriorate in solution, in which a gelatin solution or the like is used as a vehicle instead of a simple aqueous solution. For example, if a dilute gelatin solution be used as a vehicle for a crystalline substance, such as adrenalin, or for biologically active substances, such as viruses, vaccines, antigens, antibodies, etc., or other substances, e. g. flavoring materials, fruit juices, etc., of a nature such that solutions or dispersions ordinarily cannot be desiccated to give porous, extended masses, either because of dilution, crystalline nature, or other property, which ordinarily tends to deteriorate with more or less rapidity in aqueous solution, the dilute gelatin solution may be subjected to the treatment described above, with the production of a solid, porous gelatin carrying the crystalline substance in intimate admixture, which, when water is added thereto, forms a product substantially the same as the initial solution but in which the crystalline substance has not deteriorated because of contact for prolonged periods of time with water. In this way, the new gelatin may be used as a vehicle for a number of crystalline or biologically active substances intended for therapeutic or other purposes, whether the substance is intended for oral administration or for use by injection, as pure gelatin may be injected without danger of shock, and hence may be safely used as a vehicle for such materials.

Not only is the new gelatin useful as a vehicle for such materials, but also it may be used as a vehicle for relatively unstable colloidal substances, such as silver preparations and the like. Such materials may be produced or dispersed in a dilute gelatin solution instead of a simple aqueous vehicle, and the resulting dispersion, containing the unstable colloid in dilute aqueous gelatin, may then be subjected to the process described above, with the production of a solid gelatin product having the unstable colloid in intimate admixture therewith. Because of the absence of the water, there is little or no tendency for the colloid to deteriorate or change, and the product may be stored for long periods of time, and may, after such storage, be restored to form a suspension substantially the same as the initial suspension by simply adding water and dissolving or dispersing the solid, porous gelatin with simultaneous suspension of the colloid.

Where the gelatin is used as a vehicle for materials intended for therapeutic purposes, such as just referred to, it is advantageous to process the material in small containers, in which the processed material may be sealed under a vacuum, so that when the material is used, it is simply necessary to introduce water into the container to obtain the substances in small or unit quantities. On the other hand, if the materials are to be processed and stored in large quantities, it is advantageous to use large containers, e. g. containers having a capacity of as much as 100 litres or more, or even to convert the process into a continuous or semi-continuous process, freezing the solution by means of a rotating drum or spraying it into a refrigerated chamber or the like, and passing it through a suitable vacuum chamber. Of course, if the material finally obtained is intended for injection purposes or the like, sterile technique must be employed in the processing, and in such cases it will be important to carry out the process in a closed system, advantageously by freezing, processing and sealing the material within the same container and while maintaining the original vacuum thereon.

A number of processes for the production of desiccated, porous biologically active substances from corresponding liquids, such as the production of desiccated sera from liquid sera, by removing water from the frozen materials by the application thereto of a high vacuum, have been described from time to time, by myself and others, and such processes may be used for the production of the new, porous gelatinous colloids of the present invention; a process having particular advantages being that described in my Patent No. 2,066,302, patented December 29, 1936.

I claim:

1. As new products, gelatinous colloids, obtained by the rapid freezing of aqueous solutions of such substances and removal of water from the frozen material under a high vacuum, said substances being in the form of porous, sponge-like masses, pieces of which under a microscope present a capillary net-like structure, said substances, when water is added thereto, dissolving in the water with greater rapidity and at lower temperatures than such substances in granulated or powdered form.

2. As a new product, gelatin in a solid, porous, friable, dry state, obtained by the rapid freezing of a solution of gelatin in water and removal of frozen water from the frozen solution under a high vacuum, said gelatin being porous, sponge-like, and presenting under the microscope a capillary net-like structure, and, when water is added thereto, dissolving in the water more rapidly and at a lower temperature than granular gelatin.

3. As a new product, gelatin in a solid, porous, friable, dry state, obtained by the rapid freezing of an aqueous solution of gelatin containing from about 0.1% to about 2% of gelatin by indirect exposure to a refrigerant and removal of frozen water from the frozen solution under a high vacuum, said gelatin being porous, sponge-like, and presenting under the microscope a capillary net-like structure, and, when water is added thereto, dissolving in the water more rapidly and at a lower temperature than granular gelatin.

4. As a new product, gelatin in a solid, porous, friable, dry state, obtained by the rapid freezing of a solution of gelatin in water and removal of frozen water from the frozen solution under a high vacuum, said gelatin having intimately dispersed therethrough another substance.

5. As a new product, gelatin in a solid, porous, friable, dry state, obtained by the rapid freezing of a solution of gelatin in water and removal of frozen water from the frozen solution under a high vacuum, said gelatin having intimately dispersed therethrough a substance from the class consisting of crystalline and colloidal substances ordinarily unstable in the presence of water.

6. The process of producing gelatinous colloids in the form of dry, porous, friable masses which comprises freezing an aqueous solution thereof and removing water from the frozen material with the aid of a high vacuum and without melting or softening thereof.

7. The process of producing gelatin in the form of dry, porous, friable masses which comprises freezing an aqueous solution thereof and removing water from the frozen material with the aid of a high vacuum and without melting or softening thereof.

8. The process which comprises freezing a gelatin solution containing an added substance from the class consisting of crystalline and colloidal substances and removing water from the frozen material with the aid of a high vacuum and without melting or softening thereof, whereby the gelatin is obtained in the form of a dry, porous, friable, sponge-like mass with the added substance in intimate admixture.

9. As a new product, gelatin in a solid, porous, friable, dry state, obtained by the rapid freezing of a solution of gelatin in water and removal of frozen water from the frozen solution under a high vacuum.

10. As a new product, gum acacia in a solid, porous, friable, dry state, obtained by the rapid freezing of a solution of gum acacia in water and removal of frozen water from the frozen solution under a high vacuum.

JOHN REICHEL.